(12) United States Patent
Chung et al.

(10) Patent No.: US 9,359,684 B2
(45) Date of Patent: Jun. 7, 2016

(54) METHODS OF FABRICATING SELF-ALIGNED METAL LAYER STRUCTURE AND OPTIC

(71) Applicant: OmniVision Optoelectronics Technologies (Shanghai) Co., Ltd., Shanghai (CN)

(72) Inventors: Chia-Ming Chung, Shanghai (CN); Chien-Pang Lin, Shanghai (CN)

(73) Assignee: OMNIVISION OPTOELECTRONICS TECHNOLOGIES (SHANGHAI) CO., LTD., Shanghair (CN)

( * ) Notice: Subject to any disclaimer, the term of this patent is extended or adjusted under 35 U.S.C. 154(b) by 0 days.

(21) Appl. No.: 14/449,059

(22) Filed: Jul. 31, 2014

(65) Prior Publication Data

US 2015/0337449 A1    Nov. 26, 2015

(30) Foreign Application Priority Data

May 23, 2014   (CN) .......................... 2014 1 0222803

(51) Int. Cl.
*H01L 23/48* (2006.01)
*C25D 5/34* (2006.01)
*C25D 7/00* (2006.01)
*C25D 9/04* (2006.01)

(52) U.S. Cl.
CPC .. *C25D 5/34* (2013.01); *C25D 7/00* (2013.01); *C25D 9/04* (2013.01)

(58) Field of Classification Search
CPC . H01L 23/48; H01L 23/49822; H01L 25/167; H01L 2224/48997; G03B 21/28; G03B 6/132; G03B 6/4214; G03B 6/136; H05K 3/205
See application file for complete search history.

(56) References Cited

U.S. PATENT DOCUMENTS

| 5,703,675 A * | 12/1997 | Hirukawa et al. ............... 355/53 |
| 7,465,403 B2 * | 12/2008 | Kim ........................ B41J 2/1404 216/27 |
| 2010/0123582 A1 * | 5/2010 | Smith et al. ................ 340/572.3 |

* cited by examiner

*Primary Examiner* — Roy Potter
*Assistant Examiner* — Paul Patton
(74) *Attorney, Agent, or Firm* — Blakely Sokoloff Taylor & Zafman LLP (57) ABSTRACT

A method of fabricating a self-aligned metal layer structure is disclosed. The method includes: providing a substrate including a conductive layer; forming a pattern in the conductive layer; and electroplating the conductive layer to form thereon an electroplated metal layer such that the pattern is directly transferred in the electroplated metal layer in a self-aligned manner. Methods of fabricating optics are also disclosed. The methods are capable of high accuracy in alignment, and the optics can be used in the production of a lens module.

15 Claims, 9 Drawing Sheets

FIG. 1

Prior Art

METHODS OF FABRICATING SELF-ALIGNED METAL LAYER STRUCTURE AND OPTIC

CROSS-REFERENCE TO RELATED APPLICATIONS

This application claims the priority of Chinese patent application number 201410222803.1, filed on May 23, 2014, the entire contents of which are incorporated herein by reference.

TECHNICAL FIELD

The present invention relates in general to wafer fabrication, and particularly, to methods of fabricating self-aligned metal-layer structure and optics.

BACKGROUND

With the development of multimedia technology, digital still cameras, digital video cameras and mobile phones with camera functions have gained increasing popularity among consumers. In addition to their pursuit for the miniaturization of these devices, customers are also demanding for an increasing improvement in the quality (i.e., clarity) of images captured by such devices. On the other hand, whether such devices could capture high quality images heavily depends on the performance of incorporated optics.

Figure 1:
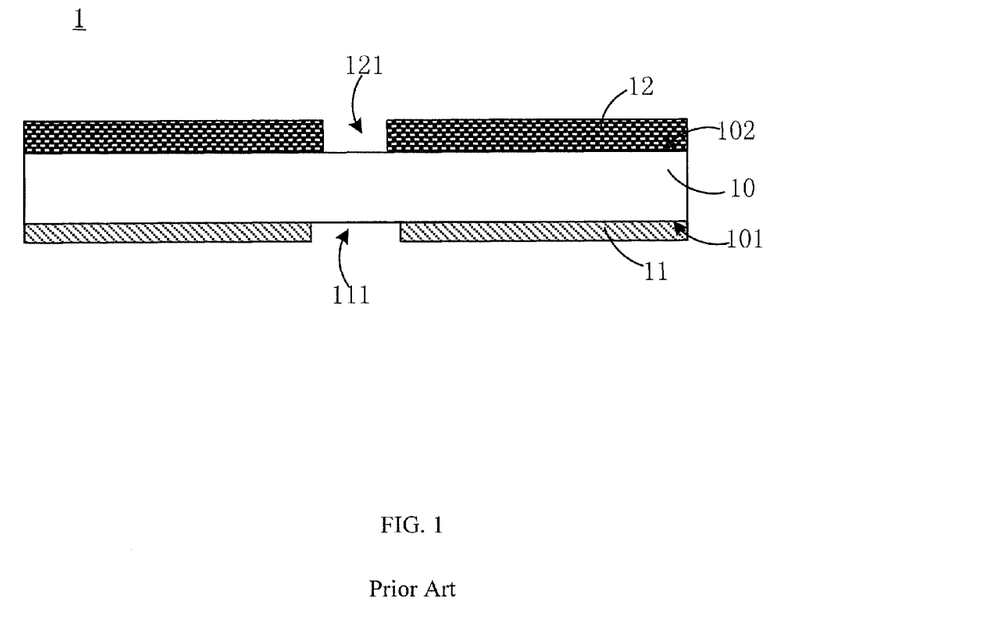
FIG. 1 shows a conventional wafer-level optic.

In general, a digital camera lens includes at least one diaphragm. FIG. 1 shows a conventional wafer-level optic, which is a diaphragm 1, including: a glass substrate 10 having a first side 101 and a second side 102 opposing the first side 101; a first light-shielding layer 11 on the first side 101, the first light-shielding layer 11 defining a first pattern 111; and a second light-shielding layer 12 on the second side 101. The second light-shielding layer 11 defines a second pattern 121 which is aligned with the first pattern 111, in order to allow passage of light.

However, as conventional techniques generally employ photolithography and etching processes to form the first and second patterns 111, 121 in the light-shielding layers 11, 12, it is difficult to achieve high accuracy in alignment between the ultimately formed patterns. This is detrimental to the optical characteristics of a lens module incorporating the optic, and is thus disadvantageous to the imaging quality of a digital camera in which the lens module is used.

SUMMARY OF THE INVENTION

It is therefore an objective of the present invention to provide methods of fabricating self-aligned metal-layer structure and optics, which can improve alignment accuracy of the first and second patterns by means of forming self-aligned, electroplated metal layers (i.e., the light-shielding layers).

In accordance with the above and further objectives of the invention, a method of fabricating a self-aligned metal layer structure includes:

providing a substrate including a conductive layer;

forming a pattern in the conductive layer; and electroplating the conductive layer to form thereon an electroplated metal layer such that the pattern is transferred in the electroplated metal layer.

Preferably, the pattern may be formed in the conductive layer by an etching process.

Preferably, the conductive layer may be formed of a non-metallic material.

Preferably, the conductive layer may be electroplated with chromium, copper, tungsten, aluminum, silver, chromium sesquioxide, thallium nitride, or silver oxide to form the electroplated metal layer.

In a further aspect, the present invention provides a method of fabricating an optic, including:

providing a glass substrate having a first side and a second side opposing the first side;

forming a first light-shielding layer over the first side of the glass substrate, the first light-shielding layer defining a first pattern;

forming one transparent conductive layer over the second side of the glass substrate;

forming a second pattern in the one transparent conductive layer such that the second pattern is aligned with the first pattern; and forming a second light-shielding layer over the one transparent conductive layer by electroplating such that the second pattern is transferred in the second light-shielding layer.

Preferably, forming the first light-shielding layer over the first side of the glass substrate may further include:

forming another transparent conductive layer over the first side of the glass substrate;

forming the first pattern in the another transparent conductive layer; and forming the first light-shielding layer over the another transparent conductive layer by electroplating such that the first pattern is transferred in the first light-shielding layer.

Preferably, the first pattern may be formed in the another transparent conductive layer over the first side of the glass substrate by an etching process.

Preferably, the second pattern may be formed in the one transparent conductive layer over the second side of the glass substrate by an etching process.

In another aspect, the present invention provides another method of fabricating an optic, including:

providing a glass substrate having a first side and a second side opposing the first side;

forming a first transparent conductive layer over the first side and a second transparent conductive layer over the second side of the glass substrate, the first transparent conductive layer defining a first pattern;

forming a second pattern in the second transparent conductive layer such that the second pattern is aligned with the first pattern; and electroplating the first and second transparent conductive layers to form thereon first and second light-shielding layers such that the first and second patterns are transferred in the first and second light-shielding layers, respectively.

Preferably, the first pattern may be formed in the first transparent conductive layer by an etching process.

Preferably, the second pattern may be formed in the second transparent conductive layer by an etching process.

Preferably, each of the first and second transparent conductive layers may be formed of indium tin oxide, indium oxide, zinc oxide, zinc aluminum oxide, tin oxide, antimony tin oxide, or fluorine tin oxide.

Preferably, each of the first and second transparent conductive layers may have a thickness of 0.1 μm to 2 μm.

Preferably, each of the first and second light-shielding layers may be formed of chromium, copper, tungsten, aluminum, silver, chromium sesquioxide, thallium nitride, or silver oxide.

Preferably, each of the first and second light-shielding layers may have a thickness of 0.05 μm to 1 μm.

Preferably, each of the first and second patterns may have a width of 0.1 mm to 50 mm.

From the above description, it can be understood that the methods of fabricating the self-aligned metal-layer structure and optics have several advantages.

First, in the method of fabricating the self-aligned metal-layer structure, especially during the electroplating process, the conductive layer acts as an electrode whereat an electric current reduces metal ions in the electroplating solution, which causes precipitation of a layer of metal over the conductive layer. The precipitation is a "self-alignment" process because in which the metal layer grows conformal to an outer contour of the conductive layer and thereby duplicates the pattern thereof in itself. This allows forming the pattern in the metal layer without involving any etching process, thereby ensuring high pattern consistency for the resulting self-aligned metal layer structure.

Second, in the methods of fabricating the optics, on one hand, since the first conductive layer and the glass substrate are both transparent, the position of the first pattern can be easily identified from the opposing side (i.e., the second side) of the glass substrate where the second pattern is to be formed, which allows the second pattern to be formed in the second conductive layer with the condition of its alignment with the first pattern visually confirmable whenever needed, and therefore ensures a good alignment result; on the other hand, as the second light-shielding layer is formed over the second conductive layer in the same manner as the above method, the second pattern can be transferred in the second light-shielding layer with high transfer accuracy. These arrangements can result in improvement in optical characteristics of a lens module incorporating the optic made in this way. Further, compared with the conventional techniques which generally use black photoresist as the second light-shielding layer, the methods of the present invention, by first forming the second pattern in the transparent conductive layer and then transferring the second pattern in the electroplated second light-shielding layer in a self-aligned manner, can improve the profile and Critical Dimension (CD) accuracy of the second pattern.

Third, the circumvention of using black photoresist prevents the methods of the invention from suffering from the following deficiencies of the conventional techniques caused thereby: 1) due to a high viscosity, black photoresist is susceptible to particle adhesion which can lead to pattern defects; 2) black photoresist usually requires the involvement of manual operations which is a cause for increase in pattern defects; 3) compared to the electroplated light-shielding layers, black photoresist is relatively inferior in adhesion to the glass substrate as well as other optical elements (such as lenses).

DETAILED DESCRIPTION

As has been found in the course of extensive researches by the inventors, the first and second patterns 111, 121 of the conventional diaphragm 1 (see FIG. 1) need to be formed by separate etching processes, during which, as both the first and second light-shielding layers are non-light-transmitting, it is difficult to realize high accuracy alignment between them. As an example, in conventional processes for this purpose, in which the first pattern 111 is formed first, a photolithography process is first performed on the first light-shielding layer 11, followed by an etching process further performed thereon, to form the first pattern 111 in the first light-shielding layer 11.

Afterward, prior to another photolithography process for forming the second pattern 121 in the second light-shielding layer 12, opaque photoresist is applied on the second light-shielding layer 12 and part of the opaque photoresist is then stripped away to form the second pattern 121 first therein. This stripping process is generally accomplished by manual operations to make sure the second pattern 121 is well aligned with the first pattern 111. However, there is currently no suitable solution for ensuring high accuracy for the alignment with the two patterns being spaced apart by the opaque light-shielding layers 11, 12.

Subsequently, with the second pattern 121 formed in the photoresist, a second photolithography process is performed on the second light-shielding layer 12 to ultimately transfer the second pattern 121 in the second light-shielding layer 12.

Further researches of the inventors have brought to light that if a second light-shielding layer 12 can be formed on the second side 102 while intrinsically having the second pattern 121, the above described problem can be solved by circumventing the need of aligning the second pattern 121 with the first pattern 111, which is on the other side of the opaque second light-shielding layer 12.

This necessitates a self-aligned growth technology for the second light-shielding layer 12. Still further researches of the inventors have also brought to light that this requirement can be met by the following contemplations: 1) given the second light-shielding layer 12 is generally a metal layer, first forming a conductive layer which contains the second pattern 121 and then forming the second light-shielding layer 12 as an electroplated metal layer growing over the conductive layer can enable duplication of the second pattern 121 in the second light-shielding layer 12; 2) implementing the conductive layer as a transparent conductive layer can further allow the second pattern 121 to be formed in the second conductive layer with the condition of its alignment with the first pattern visually confirmable whenever needed, which can ensure high pattern alignment accuracy.

On basis of the findings of the inventors, the present invention provides a self-aligned metal-layer structure and a method of fabricating the structure, an optic and methods of fabricating the optic, and a lens module, which will be described in greater detail in the following description that demonstrates preferred embodiments of the invention, in conjunction with the accompanying drawings. Those of skill in the art should, in light of the present disclosure, appreciate that many changes can be made in the specific embodiments disclosed herein and still obtain the same beneficial results. Therefore, the following description should be construed as the illustrative of the principles of the present invention, and not providing limitations thereto.

For simplicity and clarity of illustration, not all features of the specific embodiments are described. Additionally, descriptions and details of well-known functions and structures are omitted to avoid unnecessarily obscuring the invention. The development of any specific embodiment of the present invention includes specific decisions made to achieve the developer's specific goals, such as compliance with system related and business related constraints, which will vary from one implementation to another. Moreover, such a development effort might be complex and time consuming but would nevertheless be a routine undertaking for those of ordinary skill in the art.

The present invention will be further described in the following paragraphs by way of example with reference to the accompanying drawings. Features and advantages of the invention will be apparent from the following detailed description, and from the appended claims. Note that the accompanying drawings are provided in a very simplified form not necessarily presented to scale, with the only intention of facilitating convenience and clarity in explaining a few exemplary embodiments of the invention.

In accordance with the principles of the present invention, a method of fabricating a self-aligned metal-layer structure is provided, which includes the following steps:

S11) providing a substrate including a conductive layer;
S12) forming a pattern in the conductive layer; and
S13) electroplating the conductive layer to form thereon an electroplated metal layer such that the pattern is transferred in the electroplated metal layer.

Advantageously, during the electroplating of the conductive layer having the pattern, the conductive layer acts as an electrode whereat an electric current reduces metal ions in the electroplating solution, which causes precipitation of a layer of the metal over the conductive layer. The precipitation is a "self-alignment" process because in which the metal layer grows conformal to an outer contour of the conductive layer and thereby duplicates the pattern thereof in itself. This allows forming the pattern in the metal layer without involving any etching process, thereby ensuring high pattern consistency for the resulting self-aligned metal layer structure.

In accordance with the principles of the present invention, a method of fabricating an optic is also provided, which includes the following steps:

S21) providing a glass substrate having a first side and a second side opposing the first side;
S22) forming a first light-shielding layer over the first side of the glass substrate, the first light-shielding layer defining a first pattern;
S23) forming a transparent conductive layer over the second side of the glass substrate;
S24) forming a second pattern in the transparent conductive layer such that the second pattern is aligned with the first pattern; and
S25) forming a second light-shielding layer on the transparent conductive layer such that the second pattern is transferred in the second light-shielding layer.

Since the first conductive layer and the glass substrate are both transparent, the position of the first pattern can be easily identified from the opposing side (i.e., the second side) of the glass substrate where the second pattern is to be formed, which allows the second pattern to be formed in the second conductive layer with the condition of its alignment with the first pattern visually confirmable whenever needed, and therefore ensures a good alignment result. This can result in improvement in optical characteristics of a lens module incorporating the optic made in this way.

In accordance with the principles of the present invention, another method of fabricating an optic is also provided, which includes the following steps:

S31) providing a glass substrate having a first side and a second side opposing the first side;
S32) forming a first transparent conductive layer over the first side and a second transparent conductive layer over the second side of the glass substrate, the first transparent conductive layer defining a first pattern;
S33) forming a second pattern in the second transparent conductive layer such that the second pattern is aligned with the first pattern; and
S34) electroplating the first and second transparent conductive layers to form thereon first and second light-shielding layers such that the first and second patterns are transferred in the first and second light-shielding layers, respectively.

Note that the steps of any of these methods, i.e., steps S11-S13, steps S21-S25 and steps S31-S34, are not limited to the order they are described, rather they can be carried out in any order as desired.

The present invention will become more apparent from the detailed description of several possible embodiments set forth below. It is to be understood that this invention is not limited to these embodiments, and modifications made thereto by those of ordinary skill in the art based on common technical means are also considered to be within the scope of the invention.

Embodiment 1

Figure 2:
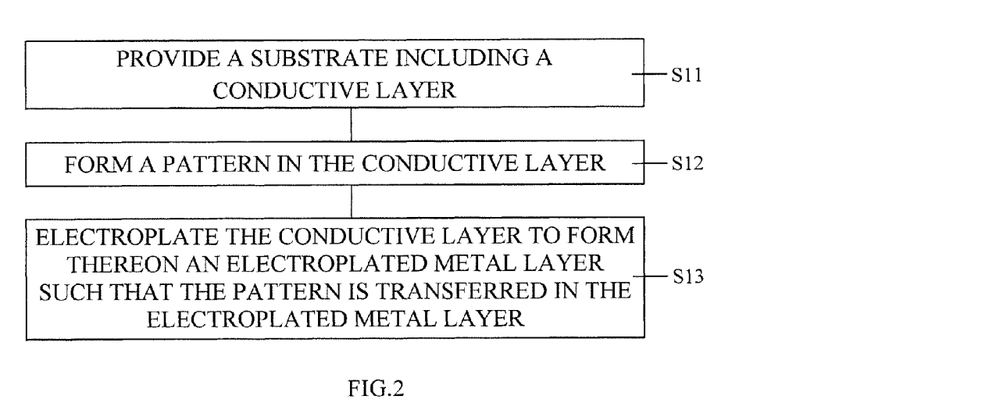
FIG. 2 depicts a flowchart graphically illustrating a method of fabricating a self-aligned metal layer structure in accordance with a first embodiment of the present invention.
Figure 3:
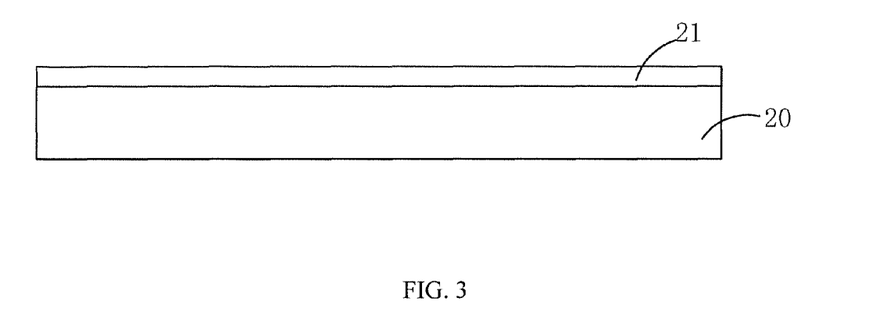
FIGS. 3-5 show individual steps of the method of FIG. 2.
Figure 4:
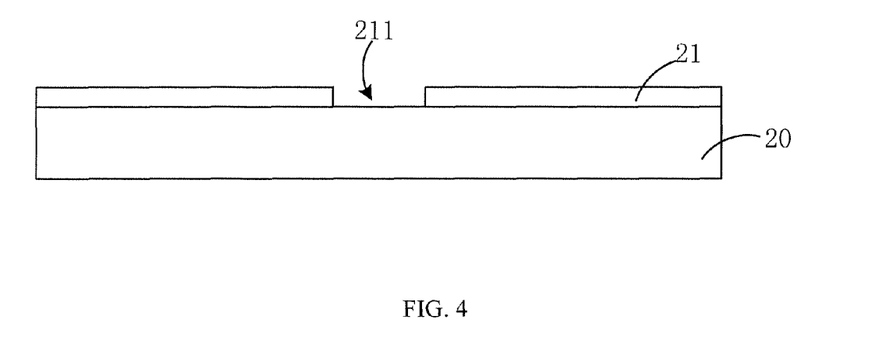
Figure 5:
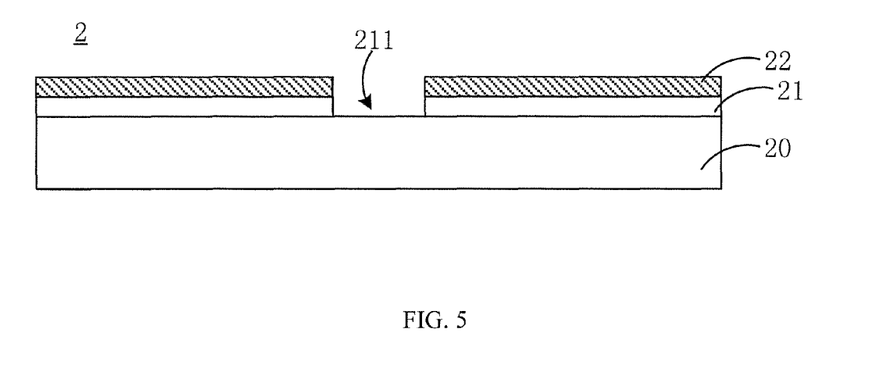

A self-aligned metal-layer structure and a method of fabricating the structure in accordance with this embodiment are described by referencing FIGS. 2-5, in which: FIG. 2 is a flowchart showing the sequential steps of the method collectively; while FIGS. 3-5 are schematic diagrams showing the same steps individually.

Turning now to FIG. 3, in a first step S11 of the method, a substrate 20 bearing a conductive layer 21 is provided. Substrates that can be used as the substrate 20 include, but not limited to, silicon substrates, germanium substrates and sapphire substrates. The conductive layer 21 may be integrally formed with the substrate 20, or be a separate layer provided on the substrate 20. Preferably, the conductive layer 21 is formed of a material selected from non-metallic materials, such as: indium tin oxide, indium oxide, zinc oxide, zinc aluminum oxide, tin oxide, antimony tin oxide, fluorine tin oxide and other metal oxides; conductive silicone and other conductive organic polymers; and graphite, polycrystalline silicon and other elemental crystalline materials, because these non-metallic materials are generally superior to metallic materials in terms of etching behavior and are thus advantageous to the profile of patterns to be formed in the conductive layer 21. The present invention is not limited to these materials, however, as any other suitable conductive material could also be employed to form the conductive layer 21. Further, although the substrate 20 is described and illustrated as bearing the conductive layer 21, the present invention is not limited in this regards as other device structures, such as an active region, may also be provided on the substrate 20 according to practical needs.

Referring to FIG. 4, in a second step S12 of the method, a pattern 211 is formed in the conductive layer 21. In this embodiment, the pattern 211 is implemented as a groove. However, in other embodiments, the pattern 211 may be implemented as any other suitable feature, for example, a through hole. Preferably, the pattern 211 is formed in the conductive layer 21 using an etching process, for example, a photolithography/dry etching process, in order to ensure a good profile.

At last, referring to FIG. 5, in a third step S13 of the method, an electroplating process is performed with the conductive layer 21 acting as an electrode whereat an electric current reduces metal ions in the electroplating solution and thereby in turn causes precipitation of an electroplated metal layer 22 thereon. The precipitation is a "self-alignment" process in which the electroplated metal layer 22 grows conformal to an outer profile of the conductive layer 21 and thereby duplicates the pattern 21 in itself. This achieves the patterning of the electroplated metal layer 22 without involving any etching process, and hence can improve transfer consistency of the pattern 21. Preferably, the material of the electroplated metal layer 22 is chromium, copper, tungsten, aluminum, silver, chromium sesquioxide, thallium nitride, or silver oxide. However, the present invention is not limited to these materials, as any other suitable conductive elemental metal or metal oxide capable of shielding light may also be employed to form the electroplated metal layer 22 without departing from the broader scope of the invention.

After the steps S11-S13, the self-aligned metal-layer structure 2 is formed as shown in FIG. 5, which includes: the substrate 20 bearing the conductive layer 21 on its one side surface, the conductive layer 21 including the pattern 211; and the electroplated metal layer 22 on the conductive layer 21, the electroplated metal layer 22 including the same pattern 211.

Embodiment 2

Figure 6:
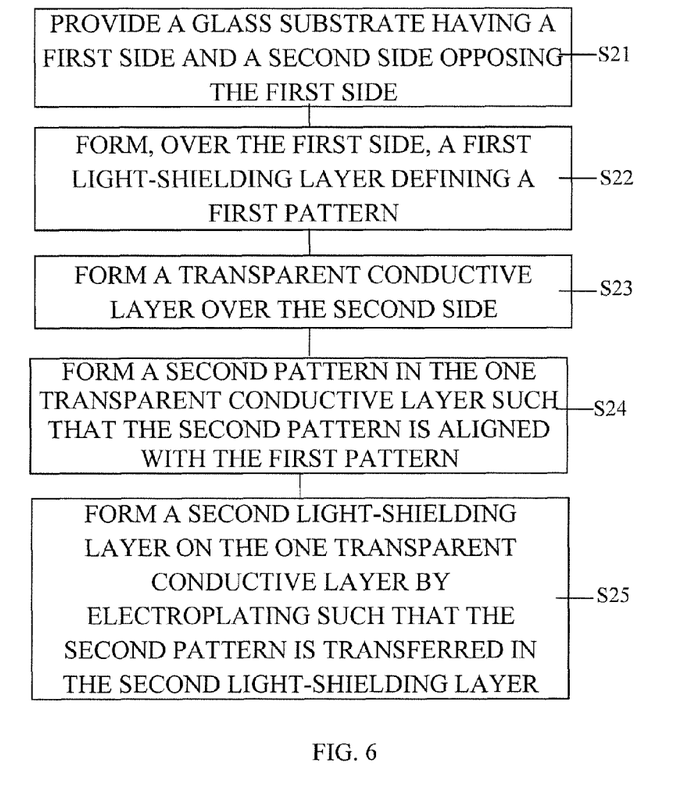
FIG. 6 depicts a flowchart graphically illustrating a method of fabricating an optic in accordance with a second embodiment of the present invention.

An optic and a method of fabricating the optic in accordance with this embodiment are described by referencing FIGS. 6-12, in which: FIG. 6 is a flowchart showing the sequential steps of the method collectively; while FIGS. 7-10 are schematic diagrams showing the same steps individually. In this method, a second light-shielding layer (corresponding to the above electroplated metal layer 22) defining a first pattern (corresponding to the above pattern 211) is formed in the same manner as the self-alignment process of Embodiment 1.

Figure 7:
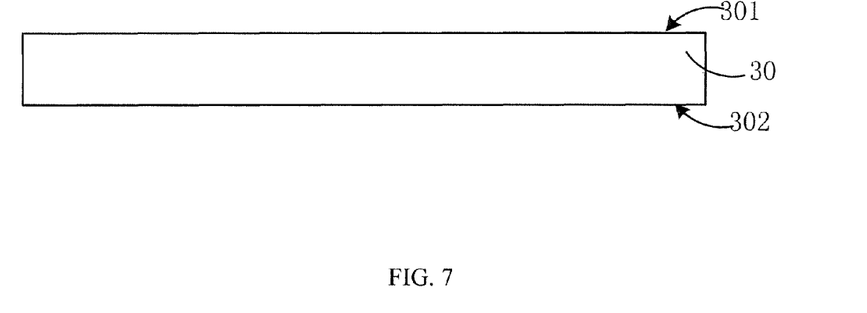
FIGS. 7-12 show individual steps of the method of FIG. 6.

Reference is first made to FIG. 7, which illustrates a first step S21 of the method, wherein a glass substrate 30 is provided, which has a first side 301 and a second side 302 opposing the first side 301. The substrate 30 may be an optical element such as, for example, a concave or convex lens, that is made of a light-transmitting material. In this embodiment, the substrate 30 is a concave or convex lens, and the optic is a diaphragm. In other embodiments, the substrate 30 may also be a planer lens or the like. The substrate 30 is desired to have a thickness of 0.1 mm to 2 mm, with 0.5 mm, 1 mm, and 1.5 mm being preferred.

Figure 8:
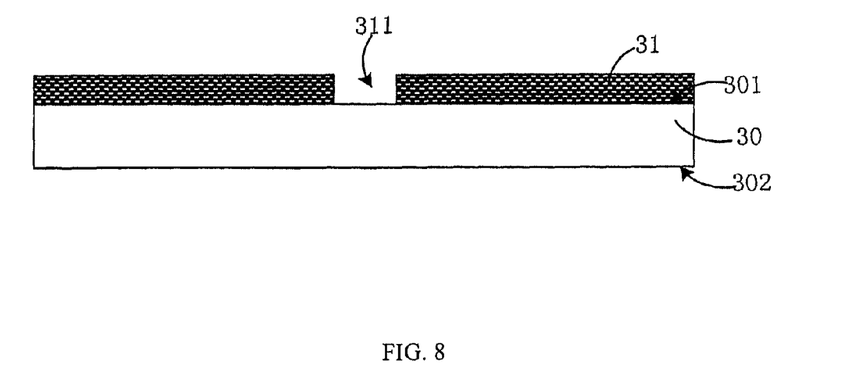

In a second step S22, as shown in FIG. 8, a first light-shielding layer 31 defining a first pattern 311 is formed on the first side 301 of the substrate 30. The first pattern 311 is desired to have a width of 0.1 mm to 50 mm, with 0.5 mm, 1 mm, 5 mm, 10 mm, 20 mm, 30 mm and 40 mm being preferred. The invention is not limited to any specific material of the first light-shielding layer 31, and in this embodiment, the first light-shielding layer 31 can be formed of any suitable non-light-transmitting material such as, for example, black photoresist or germanium. In addition, the first pattern 311 may be formed using a suitable conventional photolithography-etching process, for example, a process including the steps of: forming the first light-shielding layer 31; coating it with photoresist; forming the first pattern 311 in the photoresist by photolithography; and transferring the first pattern 311 in the first light-shielding layer 31 by etching. Further, the present invention is not limited to any specific shape of the first pattern 311, rather its shape can be determined according to practical requirements. In this embodiment, the first pattern 311 is in the shape of a square (see FIG. 11). However, in other embodiments, the first pattern 311 may be of any other suitable shape, for example, the shape of a circle, an ellipse, a rectangle, a triangle, a pentagon or a rounded rectangle.

Figure 9:
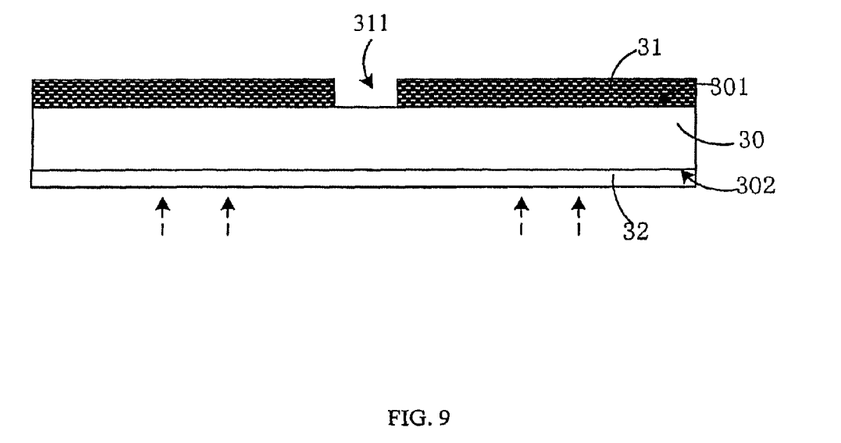

In a third step S23, as shown in FIG. 9, the second side 302 of the substrate 30 is coated with a transparent conductive layer 32. Preferably, the transparent conductive layer 32 may be made of indium tin oxide, indium oxide, zinc oxide, zinc aluminum oxide, tin oxide, antimony tin oxide, fluorine tin oxide, etc., so as to ensure appropriate transparence and electric conductivity for it. The present invention is not limited to these materials, however, as any other suitable transparent conductive layer, for example, an organic transparent conductive thin film, could be employed to form the conductive layer 32 without departing from the broader scope of the invention. The transparent conductive layer 32 is desired to have a thickness of 0.1 μm to 2 μm, with 0.5 μm, 1 μm and 1.5 μm being preferred, in order to ensure appropriate transparence and electric conductivity for it.

Figure 10:
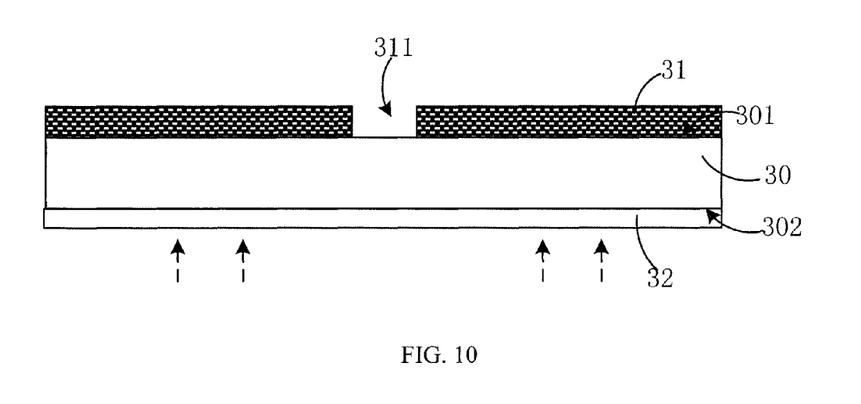
Figure 11:
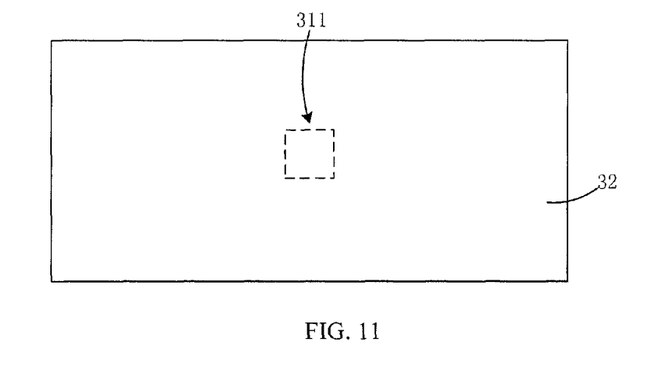

In a fourth step S24, as shown in FIG. 10, a second pattern 321 is formed in the transparent conductive layer 32 such that the second pattern 321 is aligned with the first pattern 311. The aligned first and second patterns 311, 321 allow light to perpendicularly pass through the second pattern 321, the glass substrate 30 and the first pattern 311 in this sequential order. FIG. 11 is a view taken in the direction of the arrows of FIG. 9 from the side of the transparent conductive layer 32 (i.e., the second side 302 of the substrate 30). As illustrated, as both the conductive layer 32 and the substrate 30 are transparent, the position of the first pattern 311 can be easily identified, even from the second side 302 which is opposing the first side 301, of the substrate 30, where the first pattern 311 is situated. As such, during the forming of the second pattern 321, its condition of alignment with the first pattern 311 can be visually checked whenever needed, so as to ensure an accurate alignment result, which makes ensure light can sequentially pass through the second pattern 321, the glass substrate 30 and the first pattern 311 in a direction perpendicular to them all. The present invention is not limited to any specific shape of the second pattern 321, rather its shape can be determined according to practical needs. In this embodiment, the second pattern 321 assumes the shape of a square. However, in other embodiments, the second pattern 321 may be of any other suitable shape, for example, the shape of a circle, an ellipse, a rectangle, a triangle, a pentagon or a rounded rectangle. Further, the first and second patterns 311, 321 may in the same shape or different shapes, and in the former case, a better alignment result can be achieved.

Preferably, the second pattern 321 is formed in the transparent conductive layer 32 using an etching process, for example, a photolithography/dry etching process, in order to ensure good profile of the resulting pattern 211. The second pattern 321 is desired to have a width of 0.1 mm to 50 mm, with 0.5 mm, 1 mm, 5 mm, 10 mm, 20 mm, 30 mm and 40 mm being preferred.

Figure 12:
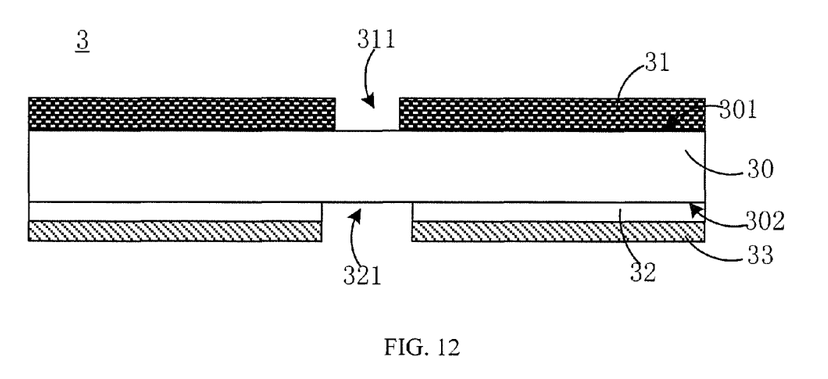

Referring to FIG. 12, in a fifth step S25, the transparent conductive layer 32 is electroplated to be coated with a second light-shielding layer 33, such that the second pattern 321 is transferred in the second light-shielding layer 33. Specifically, in the electroplating process, the transparent conductive layer 32 is energized as an electrode so that at which an electric current reduces metal ions in the electroplating solution and thereby causes precipitation of an electroplated layer 22 of the metal, i.e., the second light-shielding layer 33, over the transparent conductive layer 32. The precipitation is a self-alignment process in which the second light-shielding layer 33 grows conformal to an outer profile of the conductive layer 32 and thereby duplicates the second pattern 321 in itself. Preferably, the material from which the second light-shielding layer 33 is fabricated can be selected from chromium, copper, tungsten, aluminum, silver, chromium sesquioxide, thallium nitride and silver oxide, each of which has a good light-shielding ability. However, the present invention is not limited to these materials, as any other suitable conductive elemental metal or metal oxide capable of shielding light may be employed to form the second light-shielding layer 33 without departing from the broader scope of the invention. In order to ensure a high light-shielding ability of the second light-shielding layer 33, its thickness is desired to be in the range of 0.05 µm to 1 µm, with 0.1 µm, 0.2 µm, 0.5 µm and 0.8 µm being preferred.

FIG. 12 shows the resulting optic 3 which includes: the glass substrate 30 having the first side 301 and the second side 302 opposing the first side 301; the first light-shielding layer 31 over the first side 301, the first transparent conductive layer including the first pattern 311; the transparent conductive layer 32 on the second side 302, the transparent conductive layer 32 including the second pattern 321; and the electroplating-formed second light-shielding layer 33 over the transparent conductive layer 32, the second light-shielding layer 33 including the same second pattern 321 which is aligned with the first pattern 311.

The optic 3 can be used in the production of a lens module. The lens module incorporating one, or a combination of more, of the optics 3 can result in improvement of optical properties of an associated camera.

Embodiment 3

An optic and a method of fabricating the optic in accordance with this embodiment are described by referencing FIGS. 13-16. The optic and method of this embodiment are similar to the optic and method of Embodiment 2, respectively, but differing therefrom in also forming the first light-shielding layer 31' in the same manner as the self-alignment process of Embodiment 1, with the first light-shielding layer 31' and the first pattern 311 of this embodiment corresponding to the electroplated metal layer 22 and the pattern 211 of Embodiment 1, respectively.

Accordingly, in this embodiment, the second step S22 further includes the following steps S221-S223.

Figure 13:
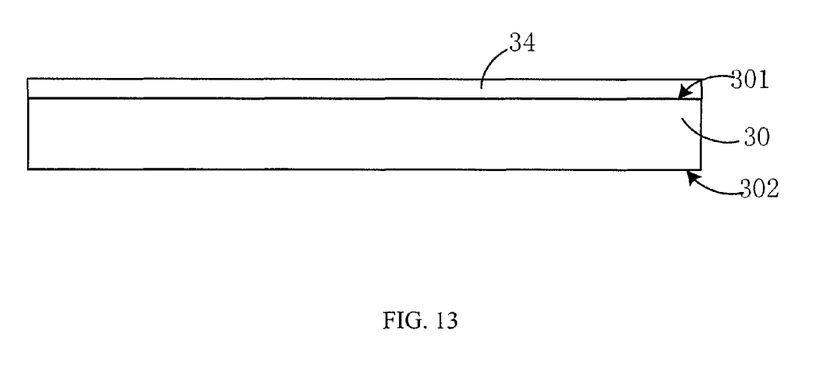
FIGS. 13-16 show the progression of a method of fabricating an optic in accordance with a third embodiment of the present invention.

In step S221, as shown in FIG. 13, a transparent conductive layer 34 is formed over the first side 301 of the substrate 30. Preferably, the transparent conductive layer 34 may be made of indium tin oxide, indium oxide, zinc oxide, zinc aluminum oxide, tin oxide, antimony tin oxide, fluorine tin oxide, etc., so as to ensure appropriate transparence and electric conductivity of the transparent conductive layer 34. The present invention is not limited to these materials, however, as any other suitable transparent conductive layer, for example, an organic transparent conductive thin film, could be employed to form the transparent conductive layer 34 without departing from the broader scope of the invention. The transparent conductive layer 34 is desired to have a thickness of 0.1 µm to 2 µm, with 0.5 µm, 1 µm and 1.5 µm being preferred, in order to ensure appropriate transparence and electric conductivity of the transparent conductive layer 34.

Figure 14:
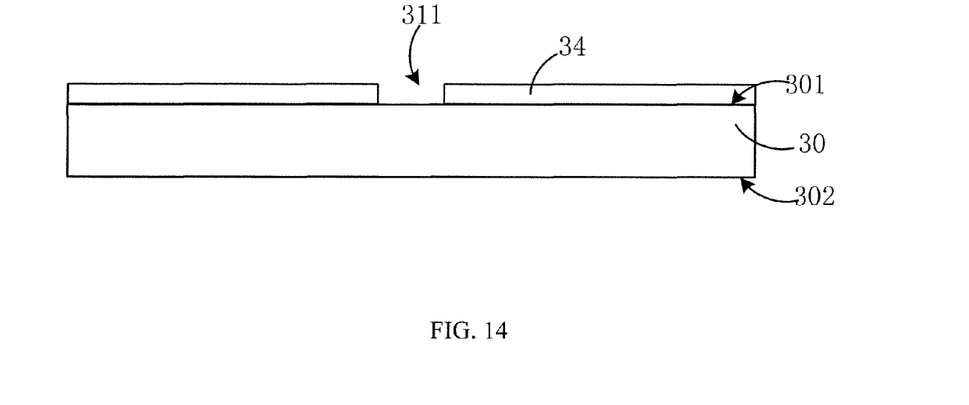

In step S222, as shown in FIG. 14, the first pattern 311 is formed in the transparent conductive layer 34. Preferably, the first pattern 311 is formed in the transparent conductive layer 34 using an etching process, for example, a photolithography/dry etching process, in order to ensure good profile of the resulting pattern 311. The first pattern 311 is desired to have a width of 0.1 mm to 50 mm, with 0.5 mm, 1 mm, 5 mm, 10 mm, 20 mm, 30 mm and 40 mm being preferred.

Figure 15:
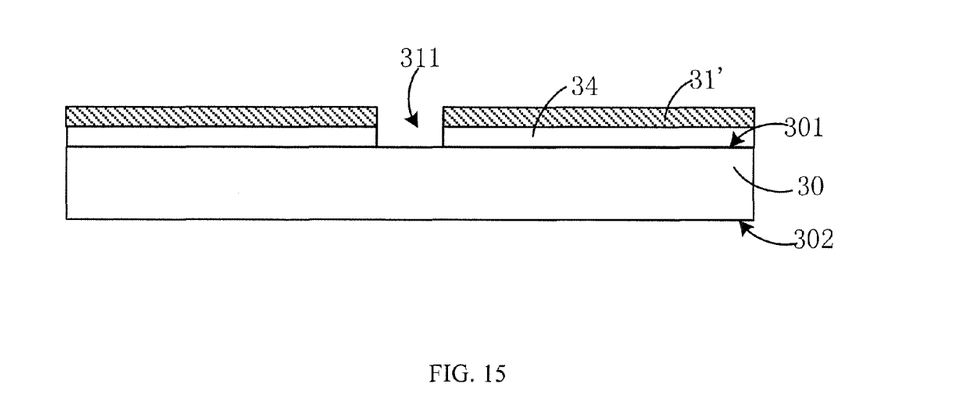

In step S223, as shown in FIG. 15, the transparent conductive layer 34 is electroplated to be coated with the first light-shielding layer 31', such that the first pattern 311 is transferred in the first light-shielding layer 31'. Similarly, in the electroplating step, the transparent conductive layer 34 is energized to cause the first light-shielding layer 31' to precipitate on the transparent conductive layer 34, such that the first pattern 311 is transferred in the first light-shielding layer 31' in a self-aligned manner. Preferably, the material from which the first light-shielding layer 31' is fabricated can be selected from chromium, copper, tungsten, aluminum, silver, chromium sesquioxide, thallium nitride and silver oxide, each of which has a good light-shielding ability. However, the present invention is not limited to these materials, as any other suitable conductive elemental metal or metal oxide capable of shielding light may be employed to form the first light-shielding layer 31' without departing from the broader scope of the invention. In order to ensure a high light-shielding ability of the first light-shielding layer 31', its thickness is desired to be in the range of 0.05 µm to 1 µm, with 0.1 µm, 0.2 µm, 0.5 µm and 0.8 µm being preferred.

Figure 16:
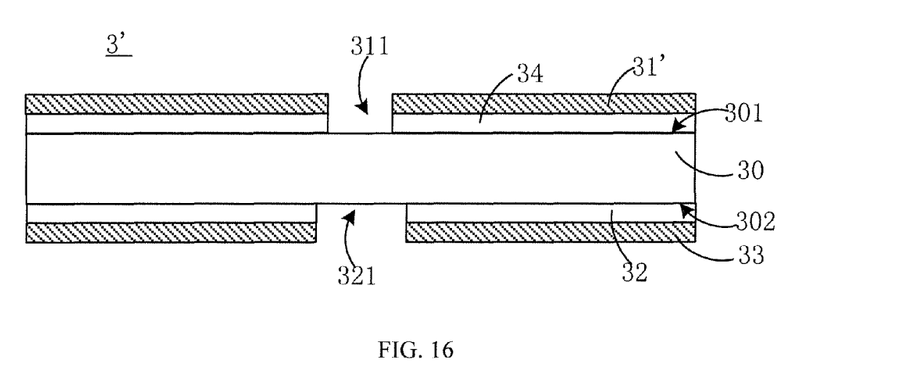

FIG. 16 shows the resulting optic 3' which further includes, compared to the optic 3 of Embodiment 2, the transparent conductive layer 34 between the first side 301 of the substrate 30 and the first light-shielding layer 31'. The transparent conductive layer 34 contains the first pattern 311, and underlies the first light-shielding layer 31' which is formed by electroplating.

Embodiment 4

An optic and a method of fabricating the optic in accordance with this embodiment are described by referencing FIGS. 17-20. The optic and method of this embodiment are similar to the optic and method of Embodiment 3, respectively, but differing therefrom in forming both the first and second light-shielding layers by electroplating.

Figure 17:
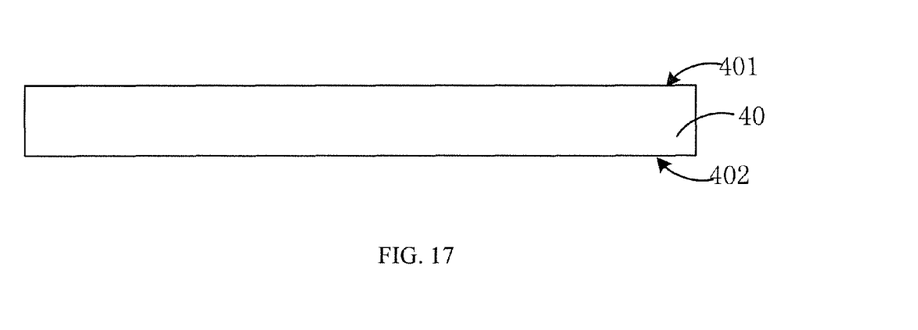
FIGS. 17-20 show the progression of a method of fabricating an optic in accordance with a fourth embodiment of the present invention.

Referring to FIG. 17, in a first step S31 of the method of this embodiment, a glass substrate 40 is provided, which has a first side 401 and a second side 402 opposing the first side 401. The substrate 40 may be an optical element such as, for example, a concave or convex lens, that is made of a light-transmitting material. In this embodiment, the substrate 40 is a concave or convex lens, and the optic is a diaphragm. In other embodiments, the substrate 40 may also be a planer lens or the like. In this embodiment, the substrate 40 is desired to have a thickness of 0.1 mm to 2 mm, with 0.5 mm, 1 mm, and 1.5 mm being preferred.

Figure 18:
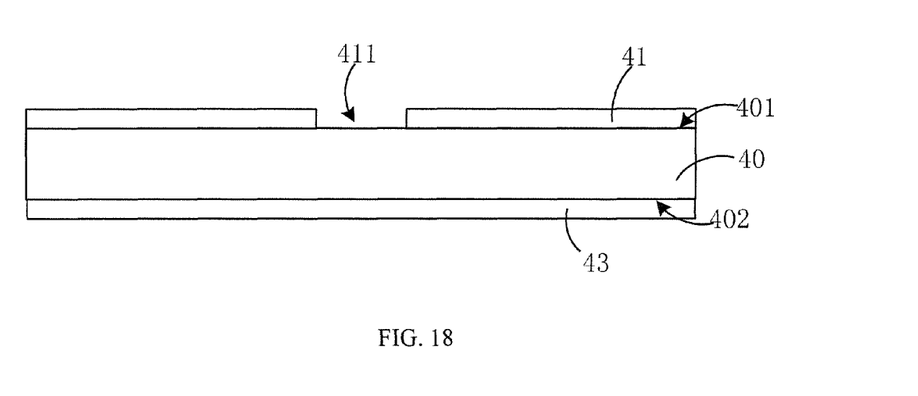

Referring to FIG. 18, in a second step S32, a first transparent conductive layer 41 is formed on the first side 401 of the substrate 40, and a second transparent conductive layer 43 is formed on the second side 402 of the substrate 40, wherein the first transparent conductive layer 41 defines a first pattern 411. The present invention is not limited to any specific shape of the first pattern 411, rather its shape can be determined according to practical needs. In this embodiment, the first pattern 411 is in the shape of a square. However, in other embodiments, the first pattern 411 may be of any other suitable shape, for example, the shape of a circle, an ellipse, a rectangle, a triangle, a pentagon or a rounded rectangle.

Preferably, the first transparent conductive layer 41 is made of indium tin oxide, indium oxide, zinc oxide, zinc aluminum oxide, tin oxide, antimony tin oxide, fluorine tin oxide, etc., so as to ensure appropriate transparence and electric conductivity of it. The present invention is not limited to these materials, however, as any other suitable transparent conductive layer, for example, an organic transparent conductive thin film, could be employed to form the first transparent conductive layer 41 without departing from the broader scope of the invention. The first transparent conductive layer 41 is desired to have a thickness of 0.1 µm to 2 µm, with 0.5 µm, 1 µm and 1.5 µm being preferred, in order to ensure appropriate transparence and electric conductivity of it. Preferably, the first pattern 411 is formed in the first transparent conductive layer 41 using an etching process, for example, a photolithography/dry etching process, in order to ensure good profile of the resulting first pattern 411. The first pattern 411 is desired to have a width of 0.1 mm to 50 mm, with 0.5 mm, 1 mm, 5 mm, 10 mm, 20 mm, 30 mm and 40 mm being preferred.

Similarly, the second transparent conductive layer 43 may be made of indium tin oxide, indium oxide, zinc oxide, zinc aluminum oxide, tin oxide, antimony tin oxide, fluorine tin oxide, etc., so as to ensure appropriate transparence and electric conductivity of it. The present invention is not limited to these materials, however, as any other suitable transparent conductive layer, for example, an organic transparent conductive thin film, could be employed to form the second transparent conductive layer 43 without departing from the broader scope of the invention. Also similarly, the second transparent conductive layer 43 is desired to have a thickness of 0.1 µm to 2 µm, with 0.5 µm, 1 µm and 1.5 µm being preferred, in order to ensure appropriate transparence and electric conductivity of it.

Figure 19:
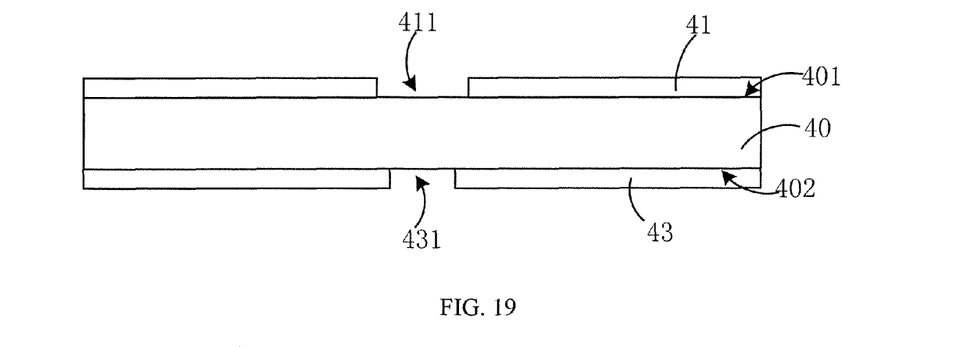

Referring to FIG. 19, in a third step S33, a second pattern 431 is formed in the second transparent conductive layer 43 such that the second pattern 431 is aligned with the first pattern 411. Preferably, the second pattern 431 is formed in the second transparent conductive layer 43 using an etching process, for example, a photolithography/dry etching process, in order to ensure good profile of the resulting second pattern 431. The second pattern 431 is desired to have a width of 0.1 mm to 50 mm, with 0.5 mm, 1 mm, 5 mm, 10 mm, 20 mm, 30 mm and 40 mm being preferred. Additionally, the present invention is not limited to any specific shape of the second pattern 431, rather its shape can be determined according to practical needs. In this embodiment, the second pattern 431 assumes the shape of a square. However, in other embodiments, the second pattern 431 may be of any other suitable shape, for example, the shape of a circle, an ellipse, a rectangle, a triangle, a pentagon or a rounded rectangle. Further, the first and second patterns 411, 431 may in the same shape or different shapes, and in the former case, a better alignment result can be achieved.

The aligned first and second patterns 411, 431 allow light to perpendicularly pass through the second pattern 431, the glass substrate 40 and the first pattern 411 in this sequential order. With similarity to the step S24 of Embodiment 2, since the first and second conductive layers 41, 43 and the substrate 40 are all transparent, the position of the first pattern 411 can be easily identified, even from the second side 402 which is opposing the first side 401, of the substrate 40, where the first pattern 411 is situated. As such, during the forming of the second pattern 431, its condition of alignment with the first pattern 411 can be visually checked whenever needed, so as to ensure an accurate alignment result and thus to make enable light can sequentially pass through the second pattern 431, the substrate 40 and the first pattern 411 in a direction perpendicular to them all.

Figure 20:
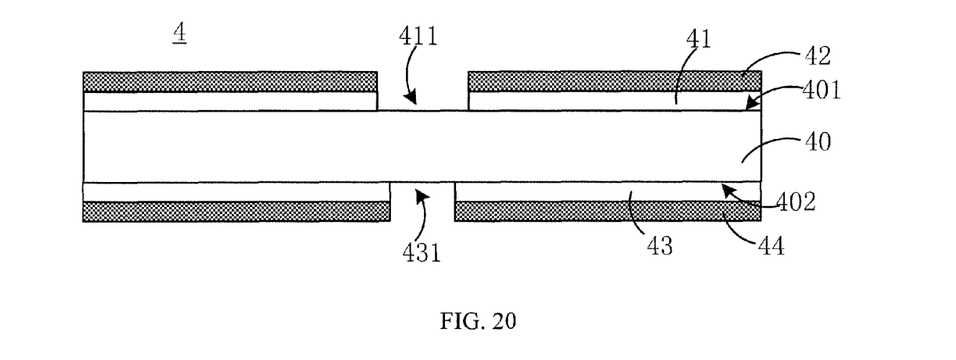

Lastly, referring to FIG. 20, in a fourth step S34, first and second light-shielding layers 42, 44 are simultaneously formed on the first and second transparent conductive layer 41, 43 by electroplating such that the first and second patterns 411, 431 are transferred in the first and second light-shielding layers 42, 44, respectively, in a self-aligned manner. Preferably, the materials from which the first and second light-shielding layers 42, 44 are fabricated can be selected individually from chromium, copper, tungsten, aluminum, silver, chromium sesquioxide, thallium nitride and silver oxide, each of which has a good light-shielding ability. However, the present invention is not limited to these materials, as any other suitable conductive elemental metal or metal oxide capable of shielding light may be employed to form the first or second light-shielding layer 42, 44 without departing from the broader scope of the invention. In order to ensure a high light-shielding ability of the first light-shielding layer 42, its thickness is desired to be in the range of 0.05 µm to 1 µm, with 0.1 µm, 0.2 µm, 0.5 µm and 0.8 µm being preferred. Similarly, a thickness of the second light-shielding layer 44 is desired to be in the range of 0.05 µm to 1 µm, with 0.1 µm, 0.2 µm, 0.5 µm and 0.8 µm being preferred, for the same reason.

FIG. 20 shows the resulting optic 4 which includes: the glass substrate 40 having the first side 401 and the second side 402 opposing the first side 401; the first transparent conductive layer 41 on the first side 401, the first transparent conductive layer 41 including the first pattern 411; the electroplating-formed first light-shielding layer 42 over the first transparent conductive layer 41, the first light-shielding layer 42 including the same first pattern 411; the second transparent conductive layer 43 on the second side 402, the second transparent conductive layer 43 including the second pattern 431; and the electroplating-formed second light-shielding layer 44 over the second transparent conductive layer 43, the second light-shielding layer 44 including the same second pattern 431.

The optic 4 can also be used in the production of a lens module. The lens module incorporating one, or a combination of more, of the optics 4 can result in improvement of optical properties of an associated camera.

From the above description, it can be understood that the self-aligned metal layer structure, optic and methods of fabricating them of this invention has several advantages.

First, in the method of fabricating the self-aligned metal-layer structure, especially during the electroplating process, the conductive layer acts as an electrode whereat an electric current reduces metal ions in the electroplating solution, which causes precipitation of a layer of the metal over the conductive layer. The precipitation is a "self-alignment" process because in which the metal layer grows conformal to an outer contour of the conductive layer and thereby duplicates the pattern thereof in itself. This allows forming the pattern in the metal layer without involving any etching process, thereby ensuring high pattern consistency for the resulting self-aligned metal layer structure.

Second, in the methods of fabricating the optics, on one hand, since the first conductive layer and the glass substrate are both transparent, the position of the first pattern can be easily identified from the opposing side (i.e., the second side) of the glass substrate where the second pattern is to be formed, which allows the second pattern to be formed in the second conductive layer with the condition of its alignment with the first pattern visually confirmable whenever needed, and therefore ensures a good alignment result; on the other hand, as the second light-shielding layer is formed over the second conductive layer in the same manner as the above structure method, the second pattern can be transferred in the second light-shielding layer with high transfer accuracy. These arrangements can result in improvement in optical characteristics of a lens module incorporating the optic made in this way. Further, compared with the conventional techniques which generally use black photoresist as the second light-shielding layer, the methods of the present invention, by first forming the second pattern in the transparent conductive layer and then transferring it in the electroplated second light-shielding layer in a self-aligned manner, can improve the profile and CD accuracy of the second pattern.

Third, the circumvention of using black photoresist prevents the methods of the invention from suffering from the following deficiencies of the conventional techniques caused thereby: 1) due to a high viscosity, black photoresist is susceptible to particle adhesion which can lead to pattern defects; 2) black photoresist usually requires the involvement of manual operations which is a cause for increase in pattern defects; 3) compared to the electroplated light-shielding layers, black photoresist is relatively inferior in adhesion to the glass substrate as well as other optical elements (such as lenses).

Obviously, those skilled in the art may make various modifications and alterations without departing from the spirit and scope of the invention. It is therefore intended that the invention be construed as including all such modifications and alterations insofar as they fall within the scope of the appended claims or equivalents thereof.

What is claimed is:

1. A method of fabricating a self-aligned metal layer structure, the method comprising the following steps in the sequence set forth:

providing a substrate comprising a conductive layer;

forming a pattern in the conductive layer; and electroplating the conductive layer to form thereon an electroplated metal layer such that the pattern is transferred in the electroplated metal layer, wherein the conductive layer is formed of a non-metallic material.

2. The method of claim 1, wherein the pattern is formed in the conductive layer by an etching process.

3. The method of claim 1, wherein the conductive layer is electroplated with chromium, copper, tungsten, aluminum, silver, chromium sesquioxide, thallium nitride, or silver oxide to form the electroplated metal layer.

4. A method of fabricating an optic, comprising the following steps in the sequence set forth:

providing a glass substrate having a first side and a second side opposing the first side;

forming a first light-shielding layer over the first side of the glass substrate, the first light-shielding layer defining a first pattern;

forming one transparent conductive layer over the second side of the glass substrate;

forming a second pattern in the one transparent conductive layer such that the second pattern is aligned with the first pattern; and forming a second light-shielding layer over the one transparent conductive layer by electroplating such that the second pattern is transferred in the second light-shielding layer.

5. The method of claim 4, wherein forming the first light-shielding layer over the first side of the glass substrate further includes:

forming a second transparent conductive layer over the first side of the glass substrate;

forming the first pattern in the second transparent conductive layer; and forming the first light-shielding layer over the second transparent conductive layer by electroplating such that the first pattern is transferred in the first light-shielding layer.

6. The method of claim 5, wherein the first pattern is formed in the second transparent conductive layer by an etching process.

7. The method of claim 4, wherein the second pattern is formed in the one transparent conductive layer over the second side of the glass substrate by an etching process.

8. A method of fabricating an optic, the method comprising the following steps in the sequence set forth:

providing a glass substrate having a first side and a second side opposing the first side;

forming a first transparent conductive layer over the first side and a second transparent conductive layer over the second side of the glass substrate, the first transparent conductive layer defining a first pattern;

forming a second pattern in the second transparent conductive layer such that the second pattern is aligned with the first pattern; and electroplating the first and second transparent conductive layers to form thereon first and second light-shielding layers such that the first and second patterns are transferred in the first and second light-shielding layers, respectively.

9. The method of claim 8, wherein the first pattern is formed in the first transparent conductive layer by an etching process.

10. The method of claim 8, wherein the second pattern is formed in the second transparent conductive layer by an etching process.

11. The method of claim 8, wherein each of the first and second transparent conductive layers is formed of indium tin oxide, indium oxide, zinc oxide, zinc aluminum oxide, tin oxide, antimony tin oxide, or fluorine tin oxide.

12. The method of claim 8, wherein each of the first and second transparent conductive layers has a thickness of 0.1 µm to 2 µm.

13. The method of claim 8, wherein each of the first and second light-shielding layers is formed of chromium, copper, tungsten, aluminum, silver, chromium sesquioxide, thallium nitride, or silver oxide.

14. The method of claim 8, wherein each of the first and second light-shielding layers has a thickness of 0.05 µm to 1 µm.

15. The method of claim 8, wherein each of the first and second patterns has a width of 0.1 mm to 50 mm.

* * * * *